United States Patent [19]
Walker

[11] Patent Number: 4,798,951
[45] Date of Patent: Jan. 17, 1989

[54] FIBER OPTIC DISPLACEMENT TRANSDUCER WITH DICHROIC TARGET

[75] Inventor: Frederick J. Walker, Bethel, Conn.

[73] Assignee: Consolidated Controls Corporation, Bethel, Conn.

[21] Appl. No.: 132,409

[22] Filed: Dec. 14, 1987

[51] Int. Cl.$^4$ .............................................. G01B 11/00
[52] U.S. Cl. .................................... 250/227; 356/373; 250/231 R
[58] Field of Search ................ 250/226, 227, 231 R, 250/231 P; 356/372, 373, 375; 73/705, 700, 655, 800

[56] References Cited

U.S. PATENT DOCUMENTS

| | | | |
|---|---|---|---|
| 4,342,919 | 8/1982 | Brogardh | 250/577 |
| 4,356,396 | 10/1982 | Ruell et al. | 250/227 |
| 4,514,860 | 4/1985 | Adolfsson | 250/227 |
| 4,523,092 | 6/1985 | Nelson | 250/231 R |
| 4,529,875 | 7/1985 | Brogardh et al. | 250/231 R |
| 4,554,449 | 11/1985 | Taniuchi et al. | 250/227 |
| 4,670,649 | 6/1987 | Senior et al. | 250/227 |
| 4,703,175 | 10/1987 | Salour et al. | 250/227 |

FOREIGN PATENT DOCUMENTS

| | | | |
|---|---|---|---|
| 132637 | 8/1983 | Japan | 73/705 |
| 230016 | 11/1985 | Japan | 356/373 |

OTHER PUBLICATIONS

James Capobianco and Joseph Rando, "Applications of An Injection Molded Bidirectional Active Coupler", ADC Fiber Optics, pp. 1–12.

Harold Roberts and Joseph Rando, "WDM Active Coupler for Bidirectional Transmission", ADC Fiber Optics, pp. 1–11.

"Fiber-Optic Instrument for Temperature Measurement", Kazuo Kyuma, S. Tai, T. Sawada and M. Nunoshita, IEEE Journal of Quantum Electronics, vol. QE-18, No. 4, Apr. 1982, pp. 676–679.

*Primary Examiner*—F. L. Evans
*Attorney, Agent, or Firm*—Andrus, Sceales, Starke & Sawall

[57] ABSTRACT

A fiber optic displacement transducer is provided by a fiber optic reflective probe (2), and an axially moveable target (4) having a dichroic optical filter (16) with first and second reflection surfaces (20 and 24) axially spaced by a fixed distance t and reflecting different wavelength light.

4 Claims, 1 Drawing Sheet

FIBER OPTIC DISPLACEMENT TRANSDUCER WITH DICHROIC TARGET

BACKGROUND AND SUMMARY

The invention relates to fiber optic displacement transducers, and more particularly to a dichroic target for a fiber optic reflective probe.

In a displacement transducer with a fiber optic reflective probe, light is emitted from a sender cable and reflected from a target to a receiver cable. The intensity of the received reflected light indicates the separation distance to the target. A problem occurs when there are optical disturbances in the sender cable, such as a kink, a poor connection, etc. which may attenuate the light intensity, which in turn gives a false reading of the separation distance to the target.

The present invention addresses and solves the noted problem.

DETAILED DESCRIPTION

Figure 1:
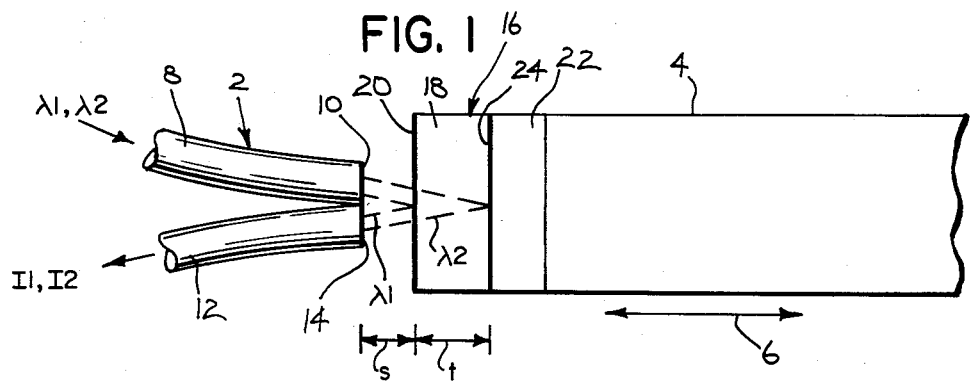
FIG. 1 schematically illustrates a reflective fiber optic probe and a dichroic target in accordance with the invention.

FIG. 1 shows a fiber optic displacement transducer including a fiber optic reflective probe 2 and a dichroic target 4. The target is movable axially as shown at arrow 6. Target 4 is mounted on a movable member (not shown) such as a micrometer fixture, a pressure element, a temperature element, etc. The probe includes a sender fiber optic cable 8 having a light emitting end 10 axially spaced from target 4, and a receiver fiber optic cable 12 having a light receiving end 14 axially spaced from target 4. The cables at their ends extend substantially parallel and axial.

An optical filter 16 is provided on target 4 by a first thin sheet of glass 18 having a thin film filter coating 20, and a second thin sheet of glass 22 having a thin film filter coating 24. In an alternate embodiment, a single sheet of glass is provided with a front coating 20 and a rear coating 24. Surface 20 reflects light of a first wavelength $\lambda 1$ from sender cable 8 to receiver cable 12. Surface 20 passes light of a second wavelength $\lambda 2$ therethrough. Glass 18 is optically transmissive to the $\lambda 2$ light. Surface 24 is axially spaced rightwardly from surface 20 by a fixed distance t which is the thickness of glass 18. Surface 24 reflects the $\lambda 2$ light from the sender cable back through glass 18 and surface 20 to receiver cable 12.

Figure 2:
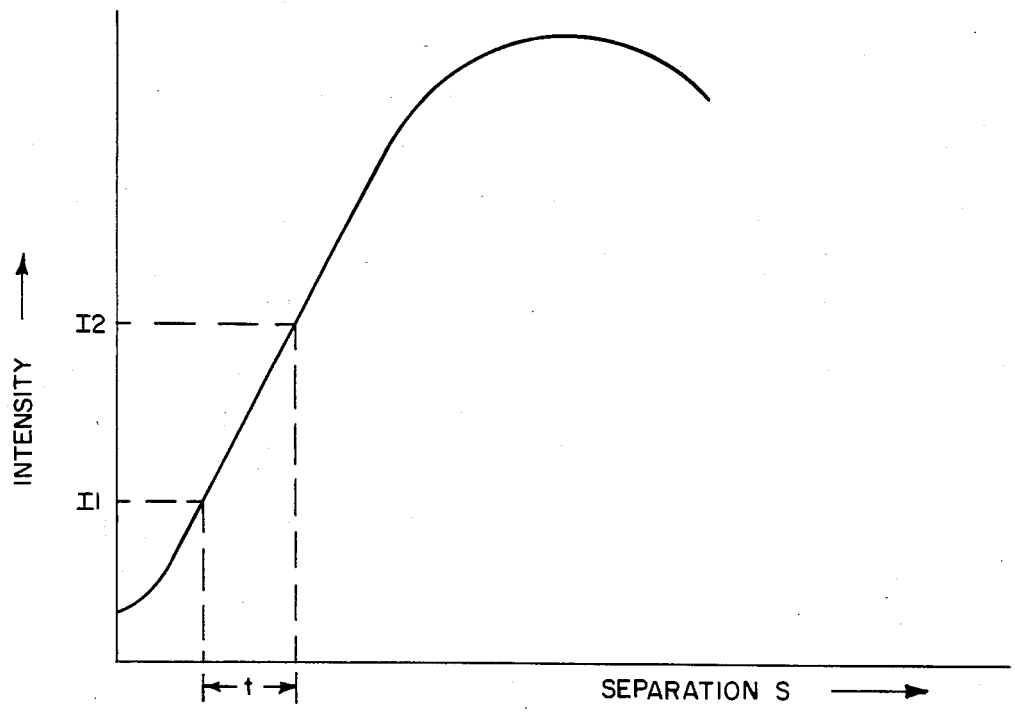
FIG. 2 is a graph illustrating light intensity versus displacement separation.

I1 is the intensity of the $\lambda 1$ light in the receiver cable, and I2 is the intensity of the $\lambda 2$ light in the receiver cable. Over a given range of axial separation s of the target from the cable ends, the value $I1/(I2-I1) \times t$ varies linearly with s as shown in FIG. 2, i.e. $s \simeq I1/(I2-I1) \times t$.

In the embodiment in FIG. 1, the cores of cables 8 and 12 have a 100 micron diameter and the cores plus claddings have a 140 micron diameter. The axial thickness of glass sheet 18 is 0.003 inch. The minimum axial separation s between the cable ends and surface 20 is about 0.003 inch to 0.006 inch. At zero separation as determined by the projection of the linear portion of the curve on the horizontal axis, FIG. 2, the light coupled is usually not zero due to some slight lack of parallelism between the target surface and the plane of the fiber ends. At axial separations above this lower limit, the above noted linear relationship is valid up to a separation s of about 0.009 to 0.012 inch (surface 24 is spaced 0.003 inch further rightwardly at 0.012 inch to 0.015 inch from the cable ends), whereafter the relationship becomes nonlinear as shown at the upper portion of the curve in FIG. 2. The range of motion of the target is about 0.006 inch. Light intensity increases with increasing axial separation s over this range, i.e from a lower limit of 0.003 inch to 0.006 inch to an upper limit of 0.009 inch to 0.012 inch.

Changes in transmitted light intensity due to optical disturbances in sender cable 8, e.g. kinks, poor connections, etc., cancel out of the fraction $I1/(I2-I1)$. This prevents a false reading of s as measured by $I1(I2-I1) \times t$ because t is fixed.

It is recognized that various equivalents, alternatives and modifications are possible within the scope of the appended claims.

I claim:

1. A fiber optic displacement transducer comprising a target movable in an axial direction, a sender fiber optic cable having a light emitting end axially spaced from said target a receiver fiber optic cable having a light receiving end axially spaced from said target, optical filter means on said target having a first surface reflecting light of a first wavelength from said sender cable to said receiver cable, said optical filter means having a second surface axially spaced from said first surface by a fixed distance t and reflecting light of a second wavelength from said sender cable to said receiver cable, where I1 is the intensity of said first wavelength light in said receiver cable and I2 is the intensity of said second wavelength light in said receiver cable, and wherein $I1(I2-I1) \times t$ varies linearly with axial separation s of said cable ends from said target over a given range of s, such that changes in transmitted light intensity due to optical disturbances in said sender cable cancel out of said fraction $I1/(I2-I1)$ whereby to prevent a false reading of s as measured by $I1/(I2-I1) \times t$, because t is fixed.

2. The invention according to claim 1 wherein said second surface is axially spaced farther from said cable ends than said first surface by said fixed distance t, and wherein said first surface passes said second wavelength light in each direction, and wherein said optical filter means comprises means between said first and second surfaces which is optically transmissive to said second wavelength light to pass the latter from said first to said second surface and then from said second to said first surface.

3. The invention according to claim 2 wherein I1 and I2 increase with increasing s over said given range of s.

4. The invention according to claim 3 wherein said cables at said ends extend substantially parallel and axial, and wherein the lower limit of said given range of s is a sufficient axial distance to enable the cone of light from said sender cable to spread sufficiently to be reflected to said receiver cable.

* * * * *